US012572592B2

(12) United States Patent
Appel et al.

(10) Patent No.: US 12,572,592 B2
(45) Date of Patent: Mar. 10, 2026

(54) AUTOMATED GRAPH EMBEDDING RECOMMENDATIONS BASED ON EXTRACTED GRAPH FEATURES

(71) Applicant: International Business Machines Corporation, Armonk, NY (US)

(72) Inventors: Ana Paula Appel, São Paulo (BR); Renato Luiz de Freitas Cunha, São Paulo (BR); Bruno Silva, São Paulo (BR); Rogerio Abreu de Paula, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 16/809,679

(22) Filed: Mar. 5, 2020

(65) Prior Publication Data

US 2021/0279279 A1 Sep. 9, 2021

(51) Int. Cl.
$$\begin{array}{ll} \textbf{\textit{G06F 16/901}} & (2019.01) \\ \textbf{\textit{G06F 18/213}} & (2023.01) \\ \textbf{\textit{G06F 18/22}} & (2023.01) \\ \textbf{\textit{G06N 20/00}} & (2019.01) \end{array}$$

(52) U.S. Cl.
CPC ........ *G06F 16/9024* (2019.01); *G06F 18/213* (2023.01); *G06F 18/22* (2023.01); *G06N 20/00* (2019.01)

(58) Field of Classification Search
CPC ...... G06F 16/84; G06F 16/9024; G06N 20/00
See application file for complete search history.

(56) References Cited

U.S. PATENT DOCUMENTS

| | | | |
|---|---|---|---|
| 7,263,462 | B2 | 8/2007 | Funge et al. |
| 7,705,847 | B2 | 4/2010 | Helfman et al. |
| 8,046,324 | B2 | 10/2011 | Patil et al. |
| 8,082,220 | B2 | 12/2011 | Hadad et al. |
| 9,652,286 | B2 | 5/2017 | Fan |
| 10,062,039 | B1 | 8/2018 | Lockett |

(Continued)

OTHER PUBLICATIONS

William Fleshman, "Spectral Clustering," Feb. 20, 2019, Towards Data Science, https://towardsdatascience.com/spectral-clustering-aba2640c0d5b (Year: 2019).*

(Continued)

*Primary Examiner* — Grace Park
(74) *Attorney, Agent, or Firm* — CANTOR COLBURN LLP; Caleb Wilkes

(57) ABSTRACT

Embodiments of the invention are directed to a computer-implemented method for matching a graph-under-analysis to a technique for embedding the graph-under-analysis. In a non-limiting example, the computer-implemented method includes receiving, using a processor, graph data representing the graph-under-analysis, wherein the graph-under-analysis represents a network. The graph data is analyzed, using the processor, to extract graph property data representing properties of the graph-under-analysis. Based at least in part on a result of analyzing the graph property data, one or more embedding techniques are selected, wherein at least one of the one or more embedding techniques is configured to transform the graph data to a graph embedding that is used by a task algorithm to perform a task.

20 Claims, 8 Drawing Sheets

Graph-under-development (GUD) 104A

EXTRACT GRAPH FEATURES 304A

EXAMPLARY GRAPH FEATURES LIST:
- SPECTRAL PROPERTIES
- DIRECTION
- WEIGHT
- TEMPORAL COMPONENTS
- NODE ATTRIBUTES
- CYCLES
- MULTI-EDGES
- BIPARTITION
- #CONNECTED NODES
- FOREST?

GUD With Annotated Features 104B

(56) References Cited

U.S. PATENT DOCUMENTS

| | | | | |
|---|---|---|---|---|
| 10,095,992 | B1 | 10/2018 | Brestoff et al. | |
| 10,331,495 | B2 | 6/2019 | Bequet et al. | |
| 10,349,134 | B2 | 7/2019 | Hamiti et al. | |
| 10,402,403 | B2 | 9/2019 | Viken et al. | |
| 10,409,828 | B2 | 9/2019 | Abdelhamid et al. | |
| 2003/0041041 | A1* | 2/2003 | Cristianini | G06N 20/00 |
| | | | | 706/12 |
| 2010/0121792 | A1 | 5/2010 | Yang et al. | |
| 2013/0138587 | A1 | 5/2013 | Patil et al. | |
| 2015/0339835 | A1* | 11/2015 | Mohr | G06T 11/206 |
| | | | | 345/440 |
| 2017/0178021 | A1 | 6/2017 | Lipkin et al. | |
| 2018/0107507 | A1 | 4/2018 | Lin et al. | |
| 2018/0129710 | A1* | 5/2018 | Tagami | G06F 16/35 |
| 2018/0341720 | A1 | 11/2018 | Bhatia et al. | |
| 2019/0122111 | A1 | 4/2019 | Min et al. | |
| 2019/0251480 | A1 | 8/2019 | Garcial. et al. | |
| 2019/0279086 | A1 | 9/2019 | Nicol et al. | |
| 2020/0210858 | A1* | 7/2020 | De Bie | G06N 5/022 |
| 2020/0258004 | A1* | 8/2020 | Heimann | G06N 20/00 |
| 2020/0387135 | A1* | 12/2020 | Khorasgani | G06K 9/6224 |
| 2021/0397790 | A1* | 12/2021 | Arvela | G06N 3/08 |

OTHER PUBLICATIONS

Appel et al., "Temporally Evolving Community Detection and Prediction in Content-Centric Networks," arXiv preprint arXiv:1807. 06560 (2018), 10 pages.
Dai et al., "Learning combinatorial optimization algorithms over graphs," Advances in Neural Information Processing Systems, 2017, 24 pages.
Ganapathiraju et al., "Schizophrenia interactome with 504 novel protein-protein interactions," NPJ Schizophrenia 2.1 (2016): 1-10.
Goyal et al., "Graph Embedding Techniques, Applications, and Performance: A Survey," Knowledge-Based Systems 151 (2018): 78-94.
Hamilton et al., "Representation learning on graphs: Methods and applications," arXiv preprint arXiv:1709.05584 (2017), 24 pages.
Huang et al., "Knowledge graph embedding based question answering," Proceedings of the Twelfth ACM International Conference on Web Search and Data Mining, ACM, 2019, 9 pages.
Ivanoska et al., "Web tool for graph embeddings representation techniques evaluation," 2019 42nd International Convention on Information and Communication Technology, Electronics and Microelectronics (MIPRO), IEEE, 2019, 6 pages.
Kumar et al., "Learning Dynamic Embeddings from Temporal Interactions." arXiv preprint arXiv:1812.02289 (2018), 11 pages.
Leskovec, "WWW-18 Tutorial: Representation Learning on Networks," The Web Conference 2018 (WWW), France, 2018, http:// snap.stanford.edu/proj/embeddings-www/ (retrieved Feb. 10, 2020), 1 page.
Simonovsky, "Deep Learning on Attributed Graphs: A Journey from Graphs to Their Embeddings and Back," arXiv preprint arXiv:1901. 08296 (2019), 121 pages.
Singer et al., "Node Embedding over Temporal Graphs," arXiv preprint arXiv:1903.08889 (2019), 8 pages.
Wang et al., "Knowledge graph embedding: A survey of approaches and applications," IEEE Transactions on Knowledge and Data Engineering 29.12 (2017): 2724-2743.
Wang et al., "Premise selection for theorem proving by deep graph embedding," Advances in Neural Information Processing Systems, 2017, 11 pages.
Wu et al., "A comprehensive survey on graph neural networks," arXiv preprint arXiv:1901.00596 (2019), 22 pages.
Xu et al., "How powerful are graph neural networks?" arXiv preprint arXiv:1810.00826 (2018), 17 pages.
Xu et al., "Knowledge graph representation with jointly structural and textual encoding," arXiv preprint arXiv:1611.08661 (2016), 7 pages.
You et al., "Graph convolutional policy network for goal-directed molecular graph generation," Advances in Neural Information Processing Systems 31, 2018, 12 pages.
Zhou et al., "Graph neural networks: A review of methods and applications," arXiv preprint arXiv:1812.08434 (2018), 22 pages.

\* cited by examiner

SYSTEM PERFORMS GRAPH ANALYTICS ON GRAPH

304

304A

EXTRACT GRAPH FEATURES

104A
Graph-under-development (GUD)

104B
GUD With Annotated Features

EXAMPLARY GRAPH FEATURES LIST:
SPECTRAL PROPERTIES
• DIRECTION
• WEIGHT
• TEMPORAL COMPONENTS
• NODE ATTRIBUTES
• CYCLES
• MULTI-EDGES
• BIPARTITION
• #CONNECTED NODES
• FOREST?

AUTOMATED GRAPH EMBEDDING RECOMMENDATIONS BASED ON EXTRACTED GRAPH FEATURES

BACKGROUND

The present invention relates in general to programmable computing devices. More specifically, the present invention relates to programmable computing systems, computer-implemented methods, and computer program products configured and arranged to automatically generate graph embedding recommendations and/or selections based at least in part on an analysis of extracted graph features.

Graphs are mathematical structures used to model pairwise relations between objects. A graph in this context is made up of vertices (also called nodes or points) that are connected by edges (also called links or lines). A distinction is made between undirected graphs in which edges link two vertices symmetrically and directed graphs in which edges link two vertices asymmetrically. Graphs can be used to model many types of relations and processes in physical, biological, social, and information systems. The term network can be defined as a graph in which attributes (e.g. names) are associated with the vertices and edges. Many real-world systems/networks can be analyzed by representing the system/network as a graph then analyzing the graph.

Although graphs are a meaningful and understandable representation of datasets organized as a network/system, the edge/node relationships in graphs can only be analyzed using a specific subset of mathematics, statistics, and machine learning techniques. In order to allow graphs to be analyzed using a broader range of machine learning and other tools, graphs can be translated to a vector space known as embeddings or graph embeddings. Graph embeddings are the transformation of various graph properties to a vector or a set of vectors. In general, computer-based analysis operations performed on vectors is simpler and faster than comparable analysis operations performed directly on graphs. The vector space captured or encoded in a graph embedding should include the graph topology, vertex-to-vertex relationship, and other relevant information about the graph, its subgraphs, and its vertices.

SUMMARY

Embodiments of the invention are directed to a computer-implemented method for matching a graph-under-analysis to a technique for embedding the graph-under-analysis. In a non-limiting example, the computer-implemented method includes receiving, using a processor, graph data representing the graph-under-analysis, wherein the graph-under-analysis represents a network. The graph data is analyzed, using the processor, to extract graph property data representing properties of the graph-under-analysis. Based at least in part on a result of analyzing the graph property data, one or more embedding techniques are selected, wherein at least one of the one or more embedding techniques is configured to transform the graph data to a graph embedding that is used by a task algorithm to perform a task.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
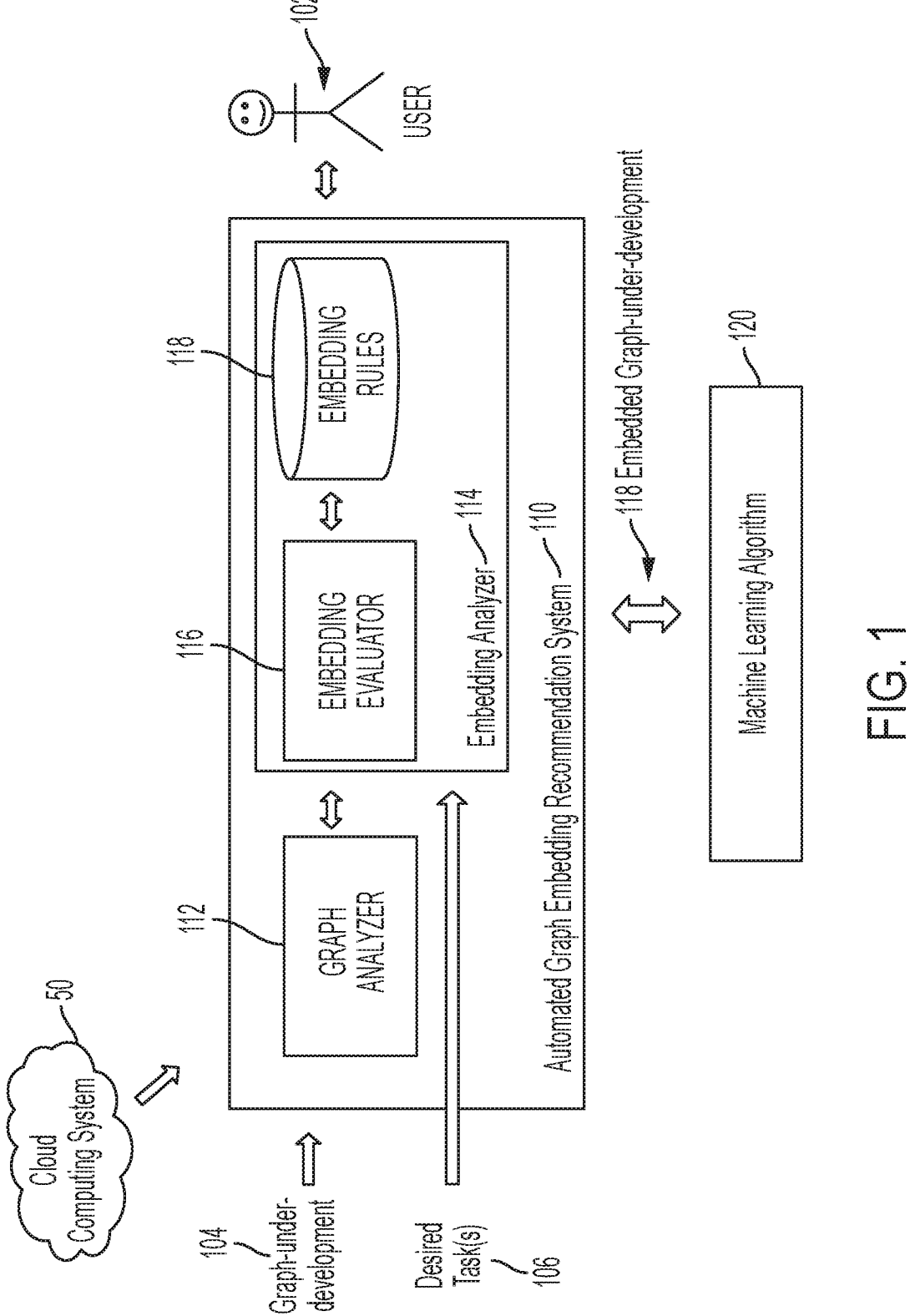
FIG. 1 depicts a block diagram illustrating a system according to embodiments of the invention.

In the accompanying figures and following detailed description of the disclosed embodiments, the various elements illustrated in the figures are provided with three-digit reference numbers. In some instances, the leftmost digits of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the present invention apply to a wide variety of module implementations. For example, a module can be implemented as a hardware circuit configured to include custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. A module can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, include the module and achieve the stated purpose for the module.

Turning now to a more detailed description of technologies related to aspects of the invention, as previously noted herein, graphs are mathematical structures used to model pairwise relationships between objects. A graph in this context is made up of vertices (also called nodes or points) that are connected by edges (also called links or lines). Graphs can be used to model many types of relationships and processes in physical, biological, social, and information systems (or networks) including but not limited to social networks, economic networks, biomedical networks, information networks, the internet, and networks of neurons. Within a given network, graphs can be used to represent various kinds of data including but not limited to molecules; mass-spring systems; n-body systems; rigid body systems; sentence and parse trees; images; and fully-connected scenes.

Many real-world systems/networks can be analyzed by representing the system/network as a graph then analyzing the graph. However, there are a limited number of analytic tools that can perform analysis directly on a graph. In order to allow graphs to be analyzed using a broader range of analytic tools (including machine learning tools), various properties of a given graph are translated to a vector (or set of vectors) known as embeddings or graph embeddings. Ideally, the vector space encoded in a graph embedding will include the graph topology and vertex-to-vertex relationships, along with other relevant information about the graph, its subgraphs, and its vertices.

Although performing computer-based analysis (e.g., machine learning) on vectors is simpler and faster than performing a comparable computer-based analysis directly on graphs, embedding graphs into a vector space presents a unique set of challenges. As an example, where a desired task will be performed on a vector space using a deep learning neural network (e.g., a convolutional neural network (CNN) and/or a recurrent neural network (RNN)), such neural networks are designed to analyze simple sequences or grids, including, for example, an RNN for text and/or a CNN for digital image/pixel grids, respectively. However, graphs of real-world networks are far more complex than simple grids or sequences. Such graphs can include complex topological structure (i.e., no spatial locality like grids; no fixed node ordering or reference points (i.e., the isomorphism problem); are often dynamic; and multi-modal features.

To address the above-described challenges, a large number of machine learning tasks have been defined for graphs, including, for example, node classification (e.g., predicting a type of a given node), link prediction (e.g., predicting whether two nodes are linked), community detection (e.g., identifying densely linked clusters of nodes), and network similarity (e.g., determining how similar are two networks or subnetworks). However, no one embedding technique is effective for all these tasks. For example, node2vec embedding techniques perform well on node classification tasks; multi-hop embedding techniques perform well on link prediction; and random walk embedding techniques are generally more efficient (i.e., $O(|E|)$ vs. $O(|V|^2)$).

Turning now to an overview of aspects of the invention, embodiments of the invention provide computer-systems, computer program products, and computer-implemented methods configured and arranged to automatically generate graph embedding recommendations based at least in part on extracted graph features. In embodiments of the invention, an automated graph embedding recommendation system is provided and includes a graph analyzer module and an embedding analyzer module. The graph analyzer module receives a graph-under-development (also referred to as a graph-under-analysis) and applies thereto feature extraction techniques that extract various graph features/characteristics directly from the graph-under-development including but not limited to computing the graph-under-development's spectrum (i.e., the eigenvalues of its adjacency matrix) to derive various graph properties from the graph-under-development's spectrum. There are several ways to associate a matrix with a graph. The properties of these matrices, especially spectral properties (eigenvalues and eigenvectors of its adjacency matrix or Laplacian matrix), convey information about the structure of the corresponding graph. Thus, embodiments of the invention generate a rich view of the properties of the graph-under-development from the eigenvalues of the graph-under-development's adjacency matrix, which have the benefit of being retrieved through computations applied directly to the graph-under-development. A graph's Laplacian matrix can be derived from its adjacency matrix. Thus, eigenvalues and the Laplacian matrix can be used to find many useful properties of a graph. For example, together with Kirchhoff's theorem, the Laplacian matrix can be used to construct low dimensional embeddings, which can be useful for a variety of machine learning applications. As another example, the eigenvalues of the Laplacian matrix of a graph are closely related to the connectivity of the graph. Therefore, bounds for the smallest nonzero eigenvalue of the graph Laplacian can be used in embodiments of the invention to uncover the level of connectivity in the graph-under-development.

The graph-under-development's extracted/computed characteristics (generated by the graph analysis module), and optionally parameters of the overall task to be performed on the graph-under-development are provided as inputs to the embedding evaluator module. The embedding evaluator module maps these inputs against a repository of associated graph/embedding data sets, which include known graphs, characteristics (or extracted features) of the known graphs, known embedding techniques, and known overall tasks. The graph/embedding data sets are associated in that each known graph in the data sets has been associated with its graph characteristics and further associated with one or more embedding techniques that have been used to translate the known graph to a vector space on which a known task has been performed. The embedding evaluator module maps the above-described inputs against the repository of associated graph/embedding data sets to identify the known graphs, characteristics of the known graphs, and the known overall tasks that have a similarity level with respect to the inputs that is over a threshold. In embodiments of the invention, the similarity level can be any measure of distance in the spaces formed by the features extracted from the graphs that are being compared. In embodiments of the invention, the above-described threshold can be set to a level that has been determined to be sufficient for concluding that the embedding technique(s) associated with a given known graph, characteristics of the known graph, and the known overall task can be successfully applied to the graph-under-development. Thus, the embedding technique associated with the known graphs, characteristics of the known graphs, and the known overall tasks that have a level of similarity to the inputs that is over the threshold can be identified or recommended by the embedding analyzer module as an embedding technique for the graph-under-development and the desired task.

In some embodiments of the invention, the embedding analyzer module can be implemented as a machine learning model that has been trained to perform the above-described mapping and embedding technique selection/recommendation using the graph/embedding data sets in the repository. In some embodiments of the invention, the embedding analyzer module can be implemented as a set of embedding rules configured and arranged to perform the above-described mapping and embedding technique selection/recommendation using the graph/embedding data sets in the repository. In some embodiments of the invention, the embedding analyzer module can be implemented as a machine learning model and a set of embedding rules that perform their mapping analyses in parallel and then their outputs are concatenated to improve overall confidence in the embedding technique selection/recommendation. In some embodiments of the invention, the embedding analyzer module can be implemented as a machine learning model and a set of embedding rules that perform their mapping analyses in series such that the output of the first analysis is fed as an input to the second analysis, thereby improving the overall confidence in the embedding technique selection/recommendation.

In some embodiments of the invention, the embedding analyzer module uses similarity level evaluations to rank the embedding technique selection/recommendations that exceed the similarity level threshold.

In some embodiments of the invention, the automated graph embedding recommendation system is configured to analyze characteristics of the graph-under-development to determine and present a set of tasks that can be performed on the graph-under-development, wherein the task desired by a user can be selected from the set of task options. If the user determines that the task options do not include a task option that is sufficiently desirable to the user, the user can provide an input to the automated graph embedding recommendation system indicating this lack of desirability (including natural language descriptions of the shortcomings of the task options), and in response thereto the automated graph embedding recommendation system can utilize natural language processing and machine learning techniques to perform further analysis to generate recommendations/suggestions for how the graph-under-development can be augmented to better align with the available task options, or to expand the task options that will be generated by the automated graph embedding recommendation system.

In some embodiments of the invention, the automated graph embedding recommendation system is further configured to embed the graph-under-development using the selected/recommended embedding technique(s), run a user-selected task on the graph embedding, present results of running the user-selected task on the graph embedding, and, optionally, update rankings of the selected/recommended embedding techniques based at least in part on the results of running the user-selected task on the graph embedding.

In some embodiments of the invention, the graph-under-development models an existing network/system. In some embodiments of the invention, the graph-under-development models a network/system that is also under development.

Turning now to a more detailed description of the aspects of the present invention, FIG. 1 depicts a diagram illustrating an automated graph embedding recommendation and/or selection system 110 according to embodiments of the invention. In aspects of the invention, the system 110 can be implemented as a programmable computer (e.g., computing system 800 shown in FIG. 8) that includes algorithms configured and arranged to carry out the functionality of the system 110 as described herein. The system 110 includes a graph analyzer 112 and an embedding analyzer 114 configured to receive as inputs a graph-under-development 104, along with optionally one or more desired tasks 108. In some embodiments of the invention, the desired task(s) 108 can selected from a set of task options that can be generated by the system 110. The system 110 is communicatively coupled to a configuration of machine learning algorithms 120, although in some embodiments of the invention, the machine learning algorithms 120 can be incorporated within the system 110. In aspects of the invention, the machine learning algorithms 120 are configured to execute a variety of graph-related tasks on graph embeddings (e.g., an embedded graph-under-development 118 generated by the system 110), including but not limited to node classification (e.g., predicting a type of a given node), link prediction (e.g., predicting whether two nodes are linked), community detection (e.g., identifying densely linked clusters of nodes), and network similarity (e.g., determining how similar are two networks or subnetworks).

Figure 2:
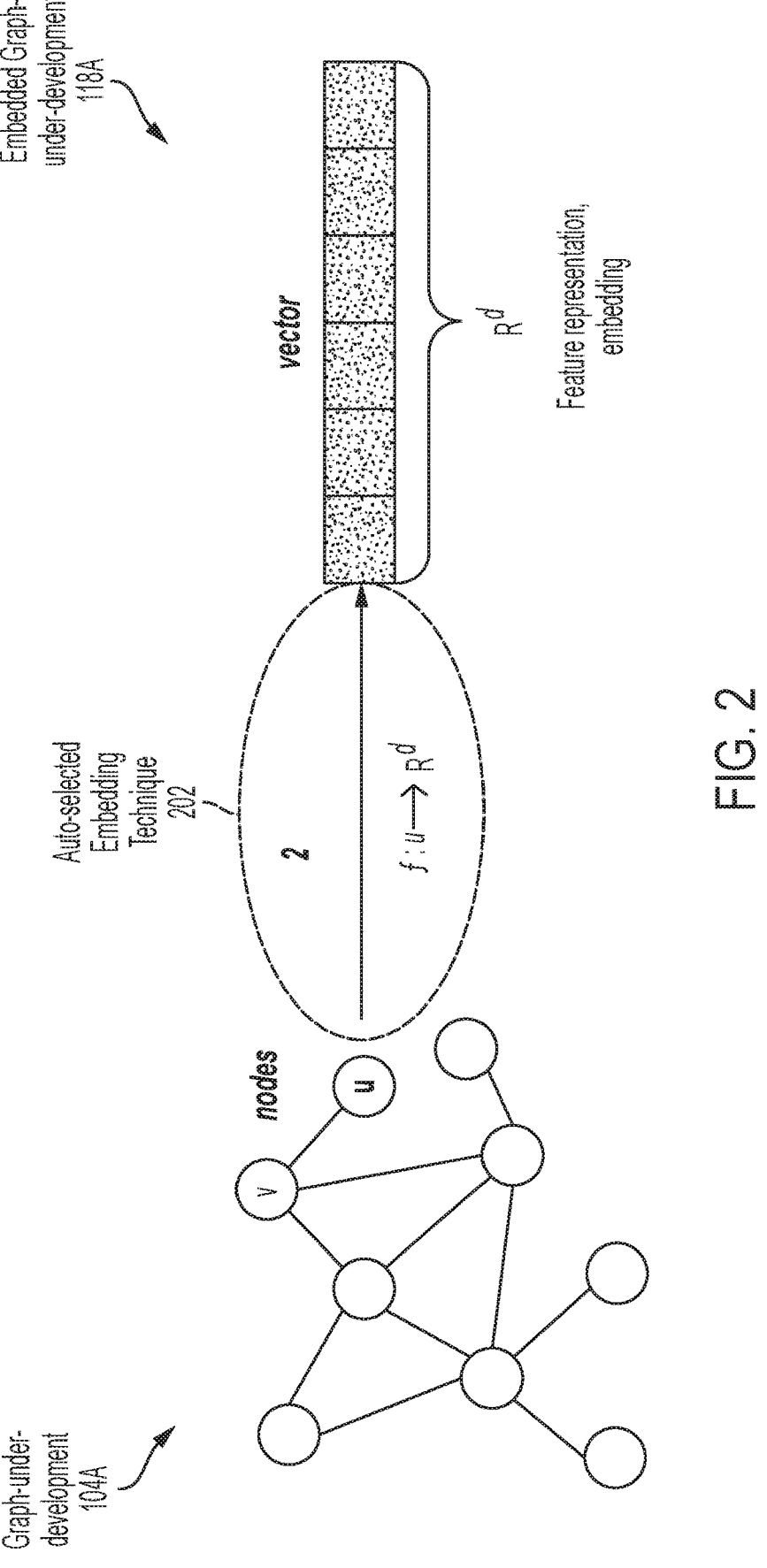
FIG. 2 depicts a block diagram illustrating a graph-under-development, an auto-selected embedding technique, and an embedded graph-under-development in accordance with embodiments of the invention.

FIG. 2 is a simplified and high-level depiction of the overall function of the system 110 (shown in FIG. 1). In accordance with aspects of the invention, the system 110 is configured and arranged to match a graph-under-development 104A to a technique for embedding the graph-under-analysis 104A. More specifically, the system 110 analyzes the graph-under-development 104A and generates, based on results of the analysis of the graph-under-development, an auto-selected embedding technique 202. The auto-selected embedding technique 202 can be applied to the graph-under-development 104A to generate an embedded graph-under-development 118A that can be further analyzed by one of the machine algorithms 120 (shown in FIG. 1). The graph-under-development 104A is an example implementation of the graph-under-development 104 (shown in FIG. 1), and the embedded graph-under development 118A is an example implementation of the embedded graph-under-development 118 (shown in FIG. 1). The auto-selected embedding technique 202 is configured to embed nodes (v, u) so that distances in the embedding space 118A reflect node similarities in the original network that is being modeled by the graph-under-development 104A.

In the simplified example show in FIG. 2, the auto-selected embedding technique 202 embed nodes (v, u) so that distances in the embedded graph-under-development 118A reflect node similarities in the graph-under-development 104A. For a graph-under-development G=(V, E), a node embedding is a mapping f: $V \rightarrow R^d$ where d is the dimensionality of the embedding space, V represents nodes, and E represents edges. For each node $(v \in V)$ a d dimensional representation is created.

Referring again to FIG. 1, in some embodiment of the invention, the embedding analyzer 114 can be implemented as an embedding evaluator 116 operating alone. In some embodiments of the invention, the embedding analyzer 114 can be implemented as a set of embedding rules 118 operating alone. In some embodiments of the invention, the embedding analyzer 114 can be implemented as the embedding evaluator 116 coupled in series with the embedding rules 118 (in any order). In some embodiments of the invention, the embedding analyzer 114 can be implemented as the embedding evaluator 116 operating in parallel with the embedding rules 118. A user 102 provides inputs to and receives information from the system 110 using, for example, a display (e.g., I/O device 830 of the computing system 830 shown in FIG. 8).

A cloud computing system 50 (also shown in FIG. 6) is in wired or wireless electronic communication with the system 110. The cloud computing system 50 can supplement, support or replace some or all of the structure and/or functionality of the system 110, the machine learning algorithm 120, and the methodology 300 (shown in FIGS. 3-5). Additionally, some or all of the functionality of the system 110, the machine learning algorithms 120, and the methodology 300 can be implemented as a node 10 (shown in FIGS. 6 and 7) of the cloud computing system 50.

The automated graph embedding recommendation system 110 can be implemented as a computing system (e.g., computing system 830 shown in FIG. 8) configured to implement a variety of algorithms, including but not limited to natural language processing algorithms and machine learning algorithms. In some aspects of the invention, inputs from the user 102 to the system 110 can be in a natural language format (e.g., natural language descriptions of the shortcomings of the task options presented by the system 110). Accordingly, aspects of the system 110 includes natural language processing algorithms that include and/or work with machine learning algorithms. In general, the natural language processing algorithms used in the system 110 include speech recognition functionality that allows the system 110 to receive natural language data (text and audio) and apply elements of language processing, information retrieval, and machine learning to derive meaning from the natural language inputs and potentially take action based on the derived meaning. The natural language processing algorithms used in accordance with aspects of the invention also include speech synthesis functionality that allows the system 110 to translate the system's actions into natural language (text and audio) to communicate aspects of the system's actions as natural language communications.

Figure 3:
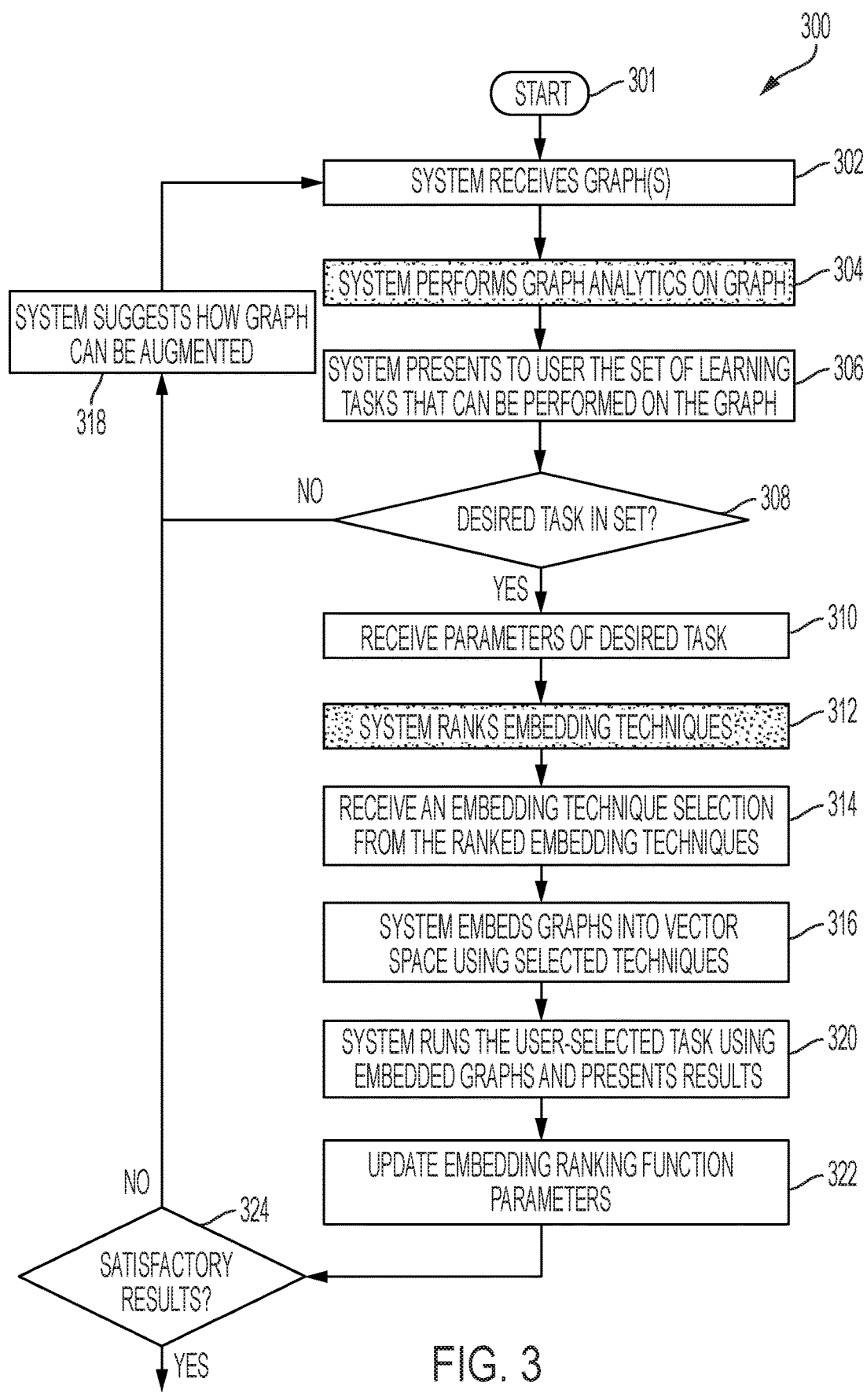
FIG. 3 depicts a flow diagram illustrating a methodology according to embodiments of the invention.
Figure 4:
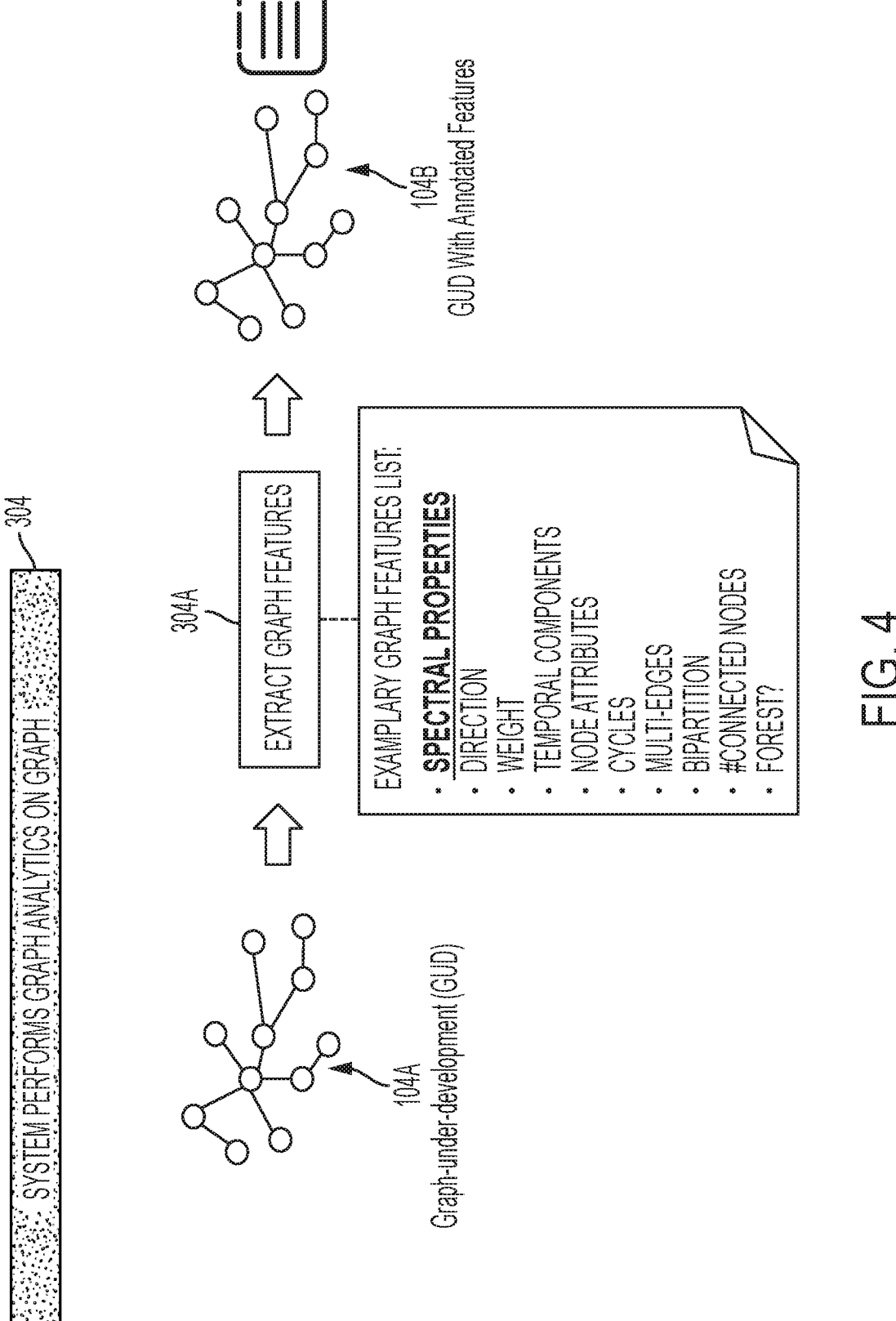
FIG. 4 depicts a block diagram illustrating an example implementation of a portion of the methodology shown in FIG. 3.
Figure 5:
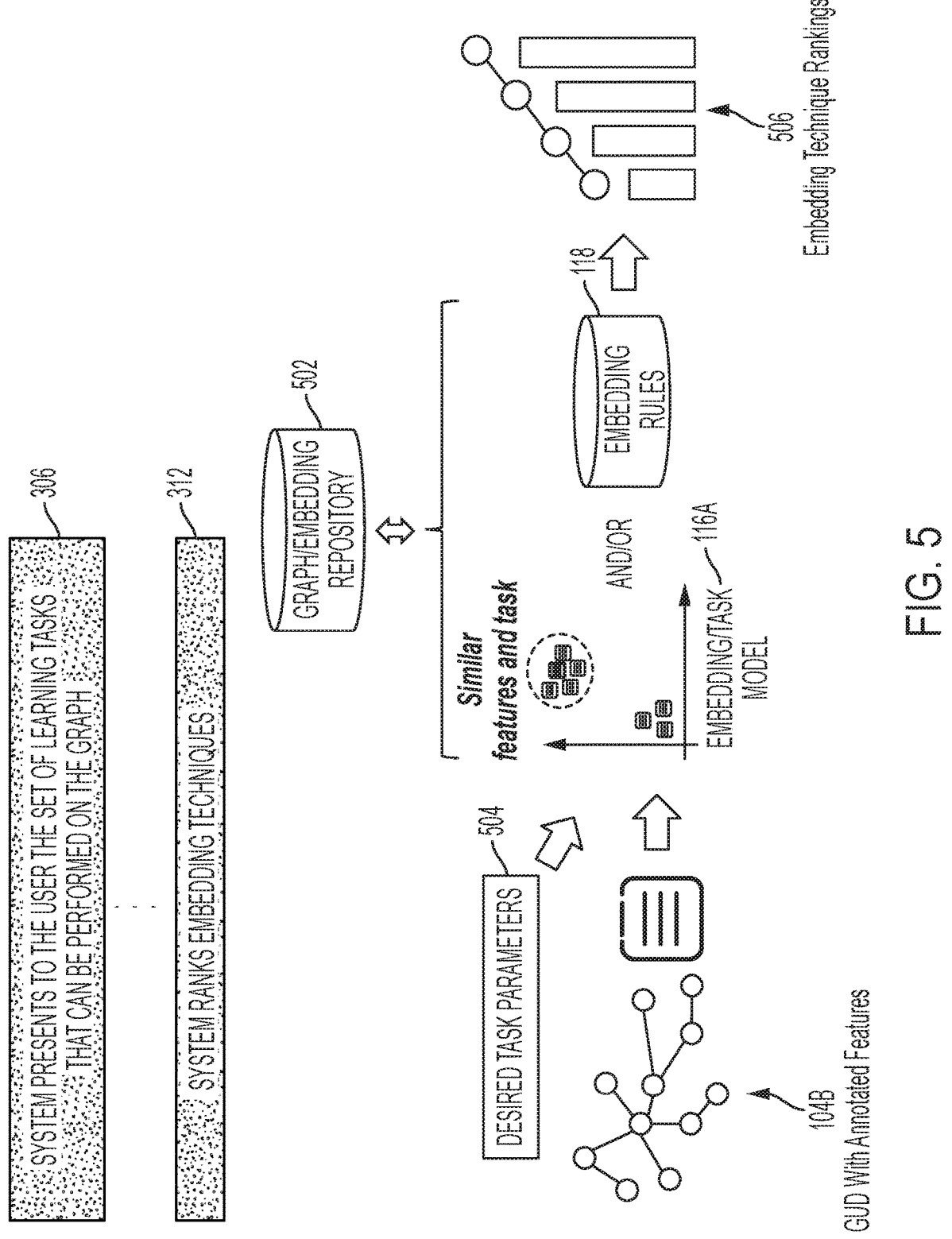
FIG. 5 depicts a block diagram illustrating an example implementation of a portion of the methodology shown in FIG. 3.

A more comprehensive description of how the system 110 operates is provided in connection with the descriptions herein of the flow diagram 300 shown in FIG. 3 and partially shown in FIGS. 4 and 5. A higher level description of how the system 110 is implemented, as well as many of the functions performed by the system 110, will now be provided with reference to FIG. 1. In accordance with aspects of the invention, the graph analyzer 112 includes feature extraction algorithms configured to extract features directly from a graph-under-development 104, including but not limited to spectral properties of the graph-under-development. Feature extraction techniques are used to reduce the number of resources required to describe a large set of data. Performing analysis of complex data can increase in difficulty as the number of variables involved increases. Analyzing a large number of variables generally requires a large amount of memory and computation power. Additionally, having a large number of variables can also cause a classification algorithm to overfit to training samples and generalize poorly to new samples. Feature extraction is a general term for methods of constructing combinations of the variables in order to work around these problems while still describing the data with sufficient accuracy.

In aspects of the invention, the embedding analyzer 114 includes an embedding evaluator 116 implemented as a machine learning algorithm that receives as inputs the graph-under-development 104, the extracted features generated by the graph analyzer 112, and the desired task 108. In aspects of the invention, the desired task 108 is provided by the user 102. The machine learning algorithm of the embedding evaluator 116 has been trained to uncover/learn patterns in the inputs it receives, including, for example, labeling (or classification) of the inputs, along with determining the similarity between the inputs and known data sets having known internal relationships between the data in the known data sets. Classification tasks often depend on the use of labeled datasets to train the neural network to recognize the correlation between labels and data. This is known as supervised learning. Examples of classification tasks include detecting people/faces in images, recognizing facial expressions (e.g., angry, joyful, etc.) in an image, identifying objects in images (e.g., stop signs, pedestrians, lane markers, etc.), recognizing gestures in video, detecting voices, detecting voices in audio, identifying particular speakers, transcribing speech into text, the like. Similarity tasks apply similarity techniques and (optionally) confidence levels (CLs) to determine a numerical representation of the similarity between a pair of items. In embodiments of the invention, the numerical representation of similarity level between, for example, graphs can be any measure of distance in the spaces formed by the features extracted from the graphs that are being compared.

In accordance with aspects of the invention, the embedding evaluator 116 uses classification and similarity machine learning techniques to generate an embedding/task model 116A (shown in FIG. 5) that can be used to map the inputs received at the embedding evaluator 116 against a graph/embedding repository 502 (shown in FIG. 5) having stored therein associated graph/embedding data sets. In embodiments of the invention, the repository 502 can be implemented as a relational database that is located in memory (e.g., memory 828 shown in FIG. 8) or any other storage location of the system 110. In general, a database is a means of storing information in such a way that information can be retrieved from it. A relational database presents information in tables with rows and columns. A table is referred to as a relation in the sense that it is a collection of objects of the same type (rows). Data in a table can be related according to common keys or concepts, and the ability to retrieve related data from a table is the basis for the term relational database. A database management system (DBMS) handles the way data is stored, maintained, and retrieved. In the case of a relational database, a relational database management system (RDBMS) performs these tasks.

In aspects of the invention, the associated graph/embedding data sets in the graph/embedding repository 502 include known graphs, characteristics of the known graphs, known embedding techniques, and known overall tasks. The graph/embedding data sets are associated in that each known graph in the data sets has been associated with its graph characteristics and further associated with one or more embedding techniques that have been have been successfully used to translate the known graph to a vector space on which a known task has been successfully performed. The embedding evaluator module 116 maps the above-described inputs against the associated graph/embedding data sets in the graph-embedding repository 502 to identify the known graphs, characteristics of the known graphs, and the known overall tasks that have a similarity level with respect to the inputs that is over a threshold. In embodiments of the invention, the similarity level can be any measure of distance in the spaces formed by the features extracted from the graphs that are being compared. In embodiments of the invention, the above-described threshold can be set to a level that has been determined to be sufficient for concluding that the embedding technique(s) associated with a given known graph, characteristics of the known graph, and the known overall task can be successfully applied to the graph-under-development 104. Thus, the embedding technique associated with the known graphs, characteristics of the known graphs, and the known overall tasks that have a similarity level with respect to the inputs (i.e., the graph-underdevelopment 104, the extracted features generated by the graph analyzer 112, and the desired task 108) that is over the threshold can be identified or recommended by the embedding analyzer module 114 as an embedding technique for the graph-under-development 104 and the desired task 108.

In some embodiments of the invention, the above-described operations of the embedding evaluator 116 of the embedding analyzer 114 can be implemented by the set of embedding rules 118 of the embedding analyzer 114, wherein the embedding rules are implemented as a rule-based algorithm configured and arranged to perform the above-described mapping and embedding technique selection/recommendation using the graph/embedding data sets in the repository 502 (shown in FIG. 5). In some embodiments of the invention, the embedding analyzer module 114 can be implemented as the embedding evaluator 116 and the embedding rules 118 performing their mapping analyses in parallel then having their outputs concatenated to improve overall confidence in the embedding technique selection/recommendation generated by the embedding analyzer module 114. In some embodiments of the invention, the embedding analyzer module 114 can be implemented by having the embedding evaluator 116 and the embedding rules 118 perform their mapping analyses in series such that the output of the first analysis (either the embedding evaluator 116 or the embedding rules 118) is fed as an input to the second analysis (either the embedding evaluator 116 or the embedding rules 118), thereby improving the overall confidence in the embedding technique selection/recommendation generated by the embedding analyzer 114.

FIG. 3 depicts a flow diagram illustrating a methodology 300 according to embodiments of the invention. The methodology 300 is implemented by the system 110 (shown in FIG. 1). The following description refers to the various operations of the methodology 300 shown in FIG. 3, along with the corresponding elements of the system 110 (shown in FIG. 1) that perform the method 300. The methodology 300 starts at block 301 then moves to block 302 where the system 110 receives the graph-under-development (or graph-under-analysis) 104. In some aspects of the invention, the graph-under-development 104 is input to the system 110 by the user 102. At block 304 the methodology 300 uses the graph analyzer module 112 to extract a variety of characteristics/features of the graph-under-development 104.

FIG. 4 depicts an example of how the operations at block 304 (shown in FIG. 3) can be implemented. As shown in FIG. 4, block 304A extracts features from a graph-under-development 104A. The set of features extracted from the graph-under-development 104A includes but is not limited to whether the graph-under-development 104A is directed or undirected; whether or not the links of the graph-under-development 104A have weights; whether or not the graph-under-development 104A has a temporal component; whether or not nodes of the graph-under-development 104A have attributes; whether or not the graph-under-development 104A has cycles; whether or not the graph-under-development 104A has multi-edges; features derived from computations of the spectral properties of the graph-under-development 104A; whether or not the graph-under-development 104A is a bipartite graph (a tree); the number of connected components in the graph-under-development 104A; whether or not the graph-under-development 104A is configured as a forest; and the size of the graph-under-development 104A (i.e., how many nodes/edges are in the graph-under-development 104A).

Referring still to FIG. 4, in accordance with aspects of the invention, the feature extraction techniques at block 304A that are used to compute directly from the graph-under-development its spectrum (i.e., the eigenvalues of its adjacency matrix) provide the methodology 300 with a particularly rich set of graph characteristics/features. This rich set of graph characteristics is particularly useful in embodiments of the invention because these characteristics can be retrieved directly from the graph itself. There are several ways to associate a matrix with a graph. The properties of these matrices, especially spectral properties (eigenvalues and eigenvectors) convey information about the structure of the corresponding graph. Thus, a rich view of the properties of graphs can be obtained from the graph's eigenvalues of its adjacency matrix. In general, the set of eigenvalues of a graph G is known as the spectrum of G and denoted by Sp (G). The most basic matrix associated with a graph is its adjacency matrix, denoted A. As an example, for a graph with n nodes, create an n×n matrix filled with zeros, and fill in a one (1) in the ith row and jth column if there is an edge between the ith and jth node. Next let D be the diagonal matrix whose ith element is the degree of the ith node, i.e., the number of edges attached to the ith node. In this example, the Laplacian matrix of the graph is L=A−D. Thus, eigenvalues and the Laplacian matrix can be used to find many useful properties of a graph. For example, together with Kirchhoff's theorem, the Laplacian matrix can be used to construct low dimensional embeddings, which can be useful for a variety of machine learning applications (e.g., the configuration of machine learning algorithms 120 shown in FIG. 1). As another example, the eigenvalues of the Laplacian matrix of a graph are closely related to the connectivity of the graph. Therefore, bounds for the smallest nonzero eigenvalue of the graph Laplacian can be used at block 304A of the methodology 300 to uncover the level of connectivity in the graph-under-development 104A. Block 304A generates a graph-under-development with annotated features 104B, which is provided to block 306 (shown in FIG. 3).

The operations depicted at blocks 306-312 will now be described with reference to the methodology 300 shown in FIG. 3, along with an example shown in FIG. 5 of how blocks 306-312 can be implemented. Block 306 uses the embedding analyzer 114 (shown in FIG. 1) to receive as inputs the graph-under-development with annotated features 104B, along with (optionally) parameters of a desired task 504. In FIG. 5, the embedding analyzer 114 is implemented as an embedding/task model 116A and/or the embedding rules 118 (also shown in FIG. 1). Block 306 further uses the embedding analyzer 114 to map the inputs received at the embedding analyzer 114 against the graph/embedding repository 502 (shown in FIG. 5) having stored therein associated graph/embedding data sets. In aspects of the invention, the associated graph/embedding data sets include known graphs, characteristics of the known graphs, known embedding techniques, and known overall tasks. The graph/embedding data sets are associated in that each known graph in the data sets has been associated with its graph characteristics and further associated with one or more embedding techniques that have been have been used to translate the known graph to a vector space on which a known task has been performed. The embedding analyzer 114 maps the above-described inputs against the associated graph/embedding data sets in the graph-embedding repository 502 to identify the known graphs, characteristics of the known graphs, and the known overall tasks that have a similarity level that is over a threshold with respect to the inputs to the embedding analyzer 114. In embodiments of the invention, the similarity level can be any measure of distance in the spaces formed by the features extracted from the graphs that are being compared. In embodiments of the invention, the above-described threshold can be set to a level that has been determined to be sufficient for concluding that the embedding technique(s) associated with a given known graph, characteristics of the known graph, and the known overall task can be successfully applied to the graph-under-development 104. Thus, the embedding technique(s) in the graph/embedding repository 502 that have a similarity level with respect to the inputs (i.e., the graph-under-development with annotated features 104B and optionally the desired task parameters 504) that is over the threshold can be identified or recommended by the embedding analyzer module 114 as an embedding technique for the graph-under-development 104A (shown in FIG. 4).

Decision block 308 presents the user 102 (shown in FIG. 1) with a set of the tasks options that were generated at block 306. In some embodiments of the invention, decision block 308 (and the overall methodology 300) can be receive inputs from the user 102 using an interactive chatbot. In some embodiments of the invention, decision block 308 (and the overall methodology 300) can receive inputs from the user 102 using an electronic form. If the user 102 determines at decision block 308 that the task options do not include a task option that is sufficiently desirable to the user 102, the user 102 can provide an input to the system 110 indicating this lack of desirability (including natural language descriptions of the shortcomings of the task options), and in response thereto the methodology 300 moves to block 318 where the system 110 utilizes its natural language processing and machine learning techniques to perform further analysis to generate recommendations/suggestions for how the graph-under-development with annotated features 104B (shown in FIG. 5) can be augmented to better align with the available task options, or to expand the task options that will be generated at block 304. For example, task options not included during the evaluation at block 304 will be excluded for a reason that is known to the methodology 300. At block 310, the methodology can recommend corrective action taken on the graph-under-development 104 (shown in FIG. 1) that would allow additional task options to be included. For example, block 318 can recommend that the user 102 add labels to graph-under-development 104 in order to include node classification task options because node classification tasks cannot be performed if the graph does not include labels. From block 318, the methodology 300 returns to block 302 to receive a new graph-under-development that can include the modifications suggested by the system 110 at block 318.

If the user 102 determines at decision block 308 that the task options include one or more task options that are sufficiently desirable to the user 102, the user 102 can provide an input to the system 110 (shown in FIG. 1) at decision block 308 indicating this desirability, and in response thereto the system 110 proceeds to block 310.

To further refine the selection and evaluation performed by the methodology 300, block 310 optionally presents the user 102 with additional questions on how to map the graph features to the learning task(s) selected. For example, where the task selected is solving a node classification problem, the user 102 can be asked to select how to map node attributes to classes.

At block 312, after taking into account any augmentations made at block 310, the task options are ranked to generate embedding technique rankings 508 (shown in FIG. 5). In embodiments of the invention, block 312 can be implemented using a ranking function that can be implemented as a set of rules; a machine learning system; or a mix between the two. In aspects of the invention, the embedding ranking function at block 312 can use as graph features, in addition to the suitability of a stored embedding technique to the task, some user requirements, such as the budget and the time available to the user 102 for performing this task. In aspects of the invention, the various algorithms (e.g., machine learning algorithms, rules-based algorithms, and the like) described herein can be configured to apply confidence levels (CLs) to various ones of their results/determinations (e.g., the previously-described similarity level) in order to improve the overall accuracy of the particular result/determination. When the algorithms described herein make a determination or generates a result (e.g., a similarity level) for which the value of CL is below a predetermined threshold (TH) (i.e., CL<TH), the result/determination can be classified as having sufficiently low "confidence" to justify a conclusion that the determination/result is not valid. If CL>TH, the determination/result can be considered valid and the determination/result can participate in downstream processing. Many different predetermined TH levels can be provided. The determinations/results with CL>TH can be ranked from the highest CL>TH to the lowest CL>TH in order to prioritize when, how and if the determinations/results are handled in downstream processing. For example, as shown in FIG. 5, CLs and THs can be used to generate embedding technique rankings 508.

Block 314 presents the embedding technique rankings 508 (shown in FIG. 5) to the user 102 (shown in FIG. 1), and the user 102 selects one or more of the embedding techniques.

Block 316 uses the selected technique(s) to embed the graph-under-development with annotated features 104B (shown in FIG. 5) into the dense vector space. In some embodiments of the invention, all of the embedding technique rankings 508 (shown in FIG. 5) are embedded into the dense vector space.

Block 320 uses the resulting embeddings from block 316 to perform the task(s) selected/identified by the user 102. The results of the task(s) are made available to the user 102.

In block 310, the system 110 (shown in FIG. 1) updates its embedding ranking functions parameters. Block 310 allows the system 110 to auto-tune itself by recording meta-data about the graph-under development 104A such as graph analytics results computed in 304 and the type of task this graph was used for, along with the quality of the results obtained using a quality metric. For classification tasks, the quality of a solution can be the accuracy obtained in the task. This information is recorded in a database (e.g., embedding/task database 502 shown in FIG. 5) and can be used to further tune the embedding ranking function used in block 312.

In decision block 324, if the user 102 (shown in FIG. 1) deems the results obtained at block 320 satisfactory, the methodology 300 finishes, and the task the user 102 wanted to perform is considered achieved. However, if at decision block 324 the user 102 deems the results obtained at block 320 unsatisfactory, the methodology 300 moves to previously-described block 318. When the methodology 300 arrives at block 318 from decision block 324, in addition to previously described suggestions, block 318 can suggest how the graph-under-development 104A (shown in FIG. 4) can be augmented such that the task(s) presented to the user 102 can achieve better results. In situations where the system 110 is unable make such a recommendation (for example, when the graph-under-development 104A is rich enough), no recommendation is made, but the methodology 300 can be restarted if desired by the user 102.

The methodology 300 is an example of how aspects of the invention can be implemented, and persons skilled in the art will recognize that the various embodiments of the invention do not require each and every operation in the methodology 300, nor do the various embodiments of the invention require the specific sequence of the operations in the methodology 300.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
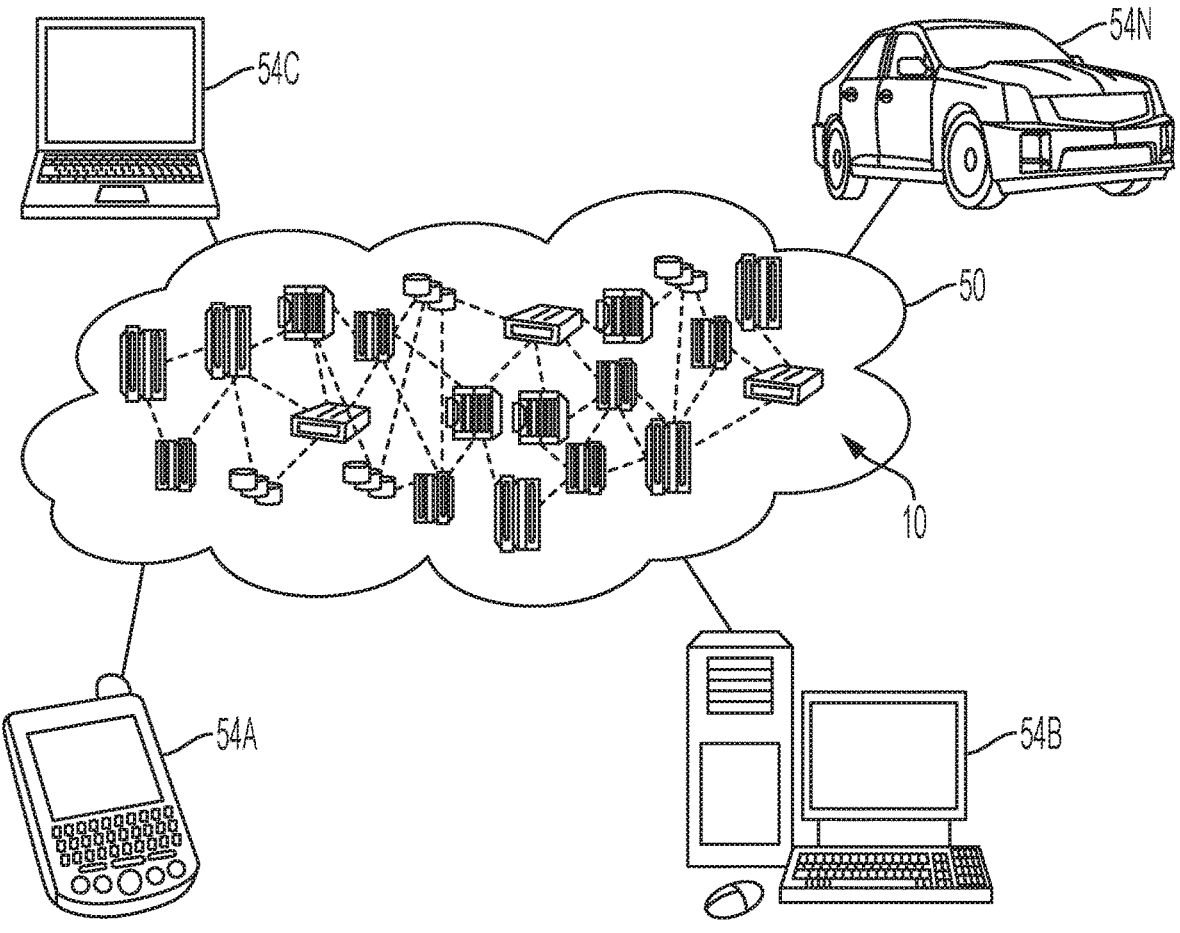
FIG. 6 depicts a cloud computing environment according to embodiments of the invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
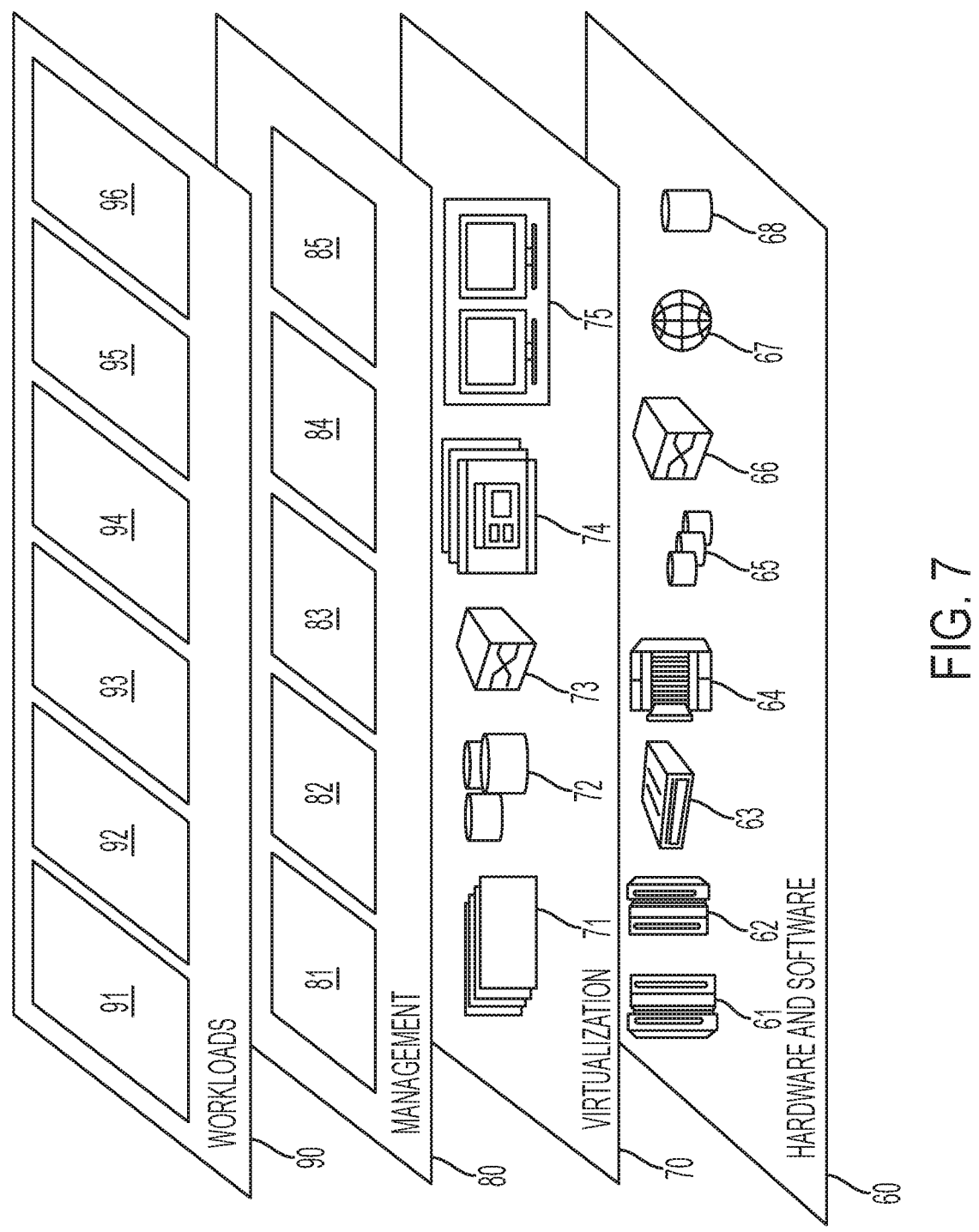
FIG. 7 depicts abstraction model layers according to embodiments of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated graph embedding technique recommendations and/or selections 96.

Figure 8:
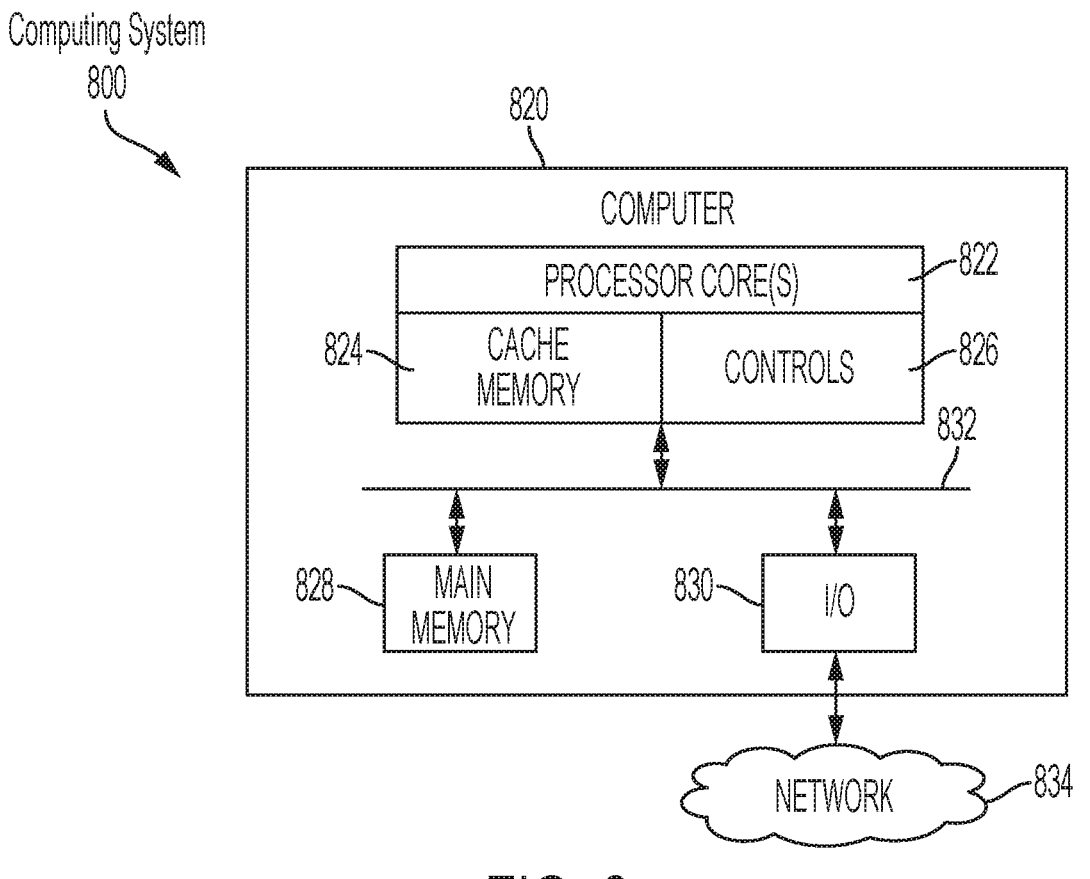
FIG. 8 depicts an exemplary computing system capable of implementing aspects of the invention.

FIG. 8 illustrates an example of a computer system 800 that can be used to implement any of the computer-based components of the various embodiments of the invention described herein. The computer system 800 includes an exemplary computing device ("computer") 802 configured for performing various aspects of the content-based semantic monitoring operations described herein in accordance aspects of the invention. In addition to computer 802, exemplary computer system 800 includes network 814, which connects computer 802 to additional systems (not depicted) and can include one or more wide area networks (WANs) and/or local area networks (LANs) such as the Internet, intranet(s), and/or wireless communication network(s). Computer 802 and additional system are in communication via network 814, e.g., to communicate data between them.

Exemplary computer 802 includes processor cores 804, main memory ("memory") 810, and input/output component(s) 812, which are in communication via bus 803. Processor cores 804 includes cache memory ("cache") 806 and controls 808, which include branch prediction structures and associated search, hit, detect and update logic, which will be described in more detail below. Cache 806 can include multiple cache levels (not depicted) that are on or off-chip from processor 804. Memory 810 can include various data stored therein, e.g., instructions, software, routines, etc., which, e.g., can be transferred to/from cache 806 by controls 808 for execution by processor 804. Input/output component(s) 812 can include one or more components that facilitate local and/or remote input/output operations to/from computer 802, such as a display, keyboard, modem, network adapter, etc. (not depicted).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method for matching a graph-under-analysis to a technique for embedding the graph-under-analysis, the computer-implemented method comprising:

receiving, using a processor, graph data representing the graph-under-analysis, wherein the graph-under-analysis represents a network;

analyzing, using the processor, the graph data to extract graph property data representing properties of the graph-under-analysis;

wherein analyzing the graph data comprises computing spectrum data of the graph-under-analysis and using the computed spectrum data to derive, directly from the computed spectrum data, the graph property data representing multiple types of the graph properties of the graph-under-analysis;

wherein the graph property data comprises the spectrum data of the graph-under-analysis;

annotating the graph data with the graph property data to generate annotated graph data, wherein the annotated graph data comprises the graph data in combination with the extracted graph property data captured as annotations associated with nodes, edges or the graph as a whole; and selecting, using the processor, from an embedding technique repository one or more embedding techniques from a group of multiple embedding techniques stored in the embedding technique repository, wherein the multiple embedding techniques are distinct from each other, wherein the selecting is based on an analysis of the annotated graph data, wherein the analysis is performed by using the annotations within the annotated graph data to inform the selection of the one or more embedding techniques;

wherein at least one of the one or more embedding techniques is configured to transform the graph data to a graph embedding that is used by a task algorithm to perform a task.

2. The computer-implemented method of claim 1, wherein the spectrum data of the graph-under-analysis comprises eigenvalues of the graph-under-analysis's adjacency matrix.

3. The computer-implemented method of claim 1, wherein selecting the one or more embedding techniques further comprises applying a set of embedding technique selection rules to the annotated graph data.

4. The computer-implemented method of claim 3, wherein:

the embedding technique repository is further configured to store graph property data comprising known graphs having known graph characteristics;

applying the set of embedding technique selection rules includes comparing the graph property data to the stored graph property data comprising known graphs having known graph characteristics;

the stored graph property data is associated with stored known graph embedding techniques that have been used to translate at least one of the known graphs to a vector space on which a known task has been performed; and selecting the one or more embedding techniques is further based at least in part on a result of using the set of embedding technique selection rules to compare the graph property data to the stored graph property data.

5. The computer-implemented method of claim 1, wherein selecting the one or more embedding techniques further comprises applying the graph property data to a machine learning model that determines a level of similarity between the graph property data and stored graph property data.

6. The computer-implemented method of claim 1 further comprising performing, using the processor, a selection process for each of the multiple types of graph properties, the selection process comprising:

selecting one of the multiple types of graph properties;

analyzing the graph property data to determine a set of task options for the selected one of the multiple types of graph properties;

receiving a selected task, wherein the selected task is one of the task options;

receiving parameters of the selected task; and receiving an instruction to apply a first one of the one or more embedding techniques to the graph data.

7. The computer-implemented method of claim 1, further comprising:

transforming the graph data according to at one of the one or more embedding techniques to produce a graph embedding; and using the task algorithm on the produced graph embedding to produce a task output.

8. A computer system for matching a graph-under-analysis to a technique for embedding the graph-under-analysis, the computer system comprising:

a memory; and a processor communicatively coupled to the memory and configured to perform processor operations comprising:

receiving graph data representing the graph-under-analysis, wherein the graph-under-analysis represents a network;

analyzing the graph data to extract graph property data representing properties of the graph-under-analysis;

wherein analyzing the graph data comprises computing spectrum data of the graph-under-analysis and using the computed spectrum data to derive, directly from the computed spectrum data, the graph property data representing multiple types of the graph properties of the graph-under-analysis;

wherein the graph property data comprises the spectrum data of the graph-under-analysis;

annotating the graph data with the graph property data to generate annotated graph data, wherein the annotated graph data comprises the graph data in combination with the extracted graph property data captured as annotations associated with nodes, edges or the graph as a whole; and selecting, from an embedding technique repository one or more embedding techniques from a group of multiple embedding techniques, wherein the multiple embedding techniques are distinct from each other, wherein the selecting is based on an analysis of the annotated graph data, wherein the analysis is performed by using the annotations within the annotated graph data to inform the selection of the one or more embedding techniques;

wherein at least one of the one or more embedding techniques is configured to transform the graph data to a graph embedding that is used by a task algorithm to perform a task.

9. The computer system of claim 8, wherein the spectrum data of the graph-under-analysis comprises eigenvalues of the graph-under-analysis's adjacency matrix.

10. The computer system of claim 8, wherein selecting the one or more embedding techniques further comprises applying a set of embedding technique selection rules to the annotated graph data.

11. The computer system of claim 10, wherein:

the embedding technique repository is further configured to store graph property data comprising known graphs having known graph characteristics;

applying the set of embedding technique selection rules includes comparing the graph property data to the stored graph property data comprising known graphs having known graph characteristics;

the stored graph property data is associated with stored known graph embedding techniques that have been used to translate at least one of the known graphs to a vector space on which a known task has been performed; and selecting the one or more embedding techniques is further based at least in part on a result of using the set of embedding technique selection rules to compare the graph property data to the stored graph property data.

12. The computer system of claim 8, wherein selecting the one or more embedding techniques further comprises applying the graph property data to a machine learning model that determines a level of similarity between the graph property data and stored graph property data.

13. The computer system of claim 8, wherein the processor operations further comprise performing a selection process for a first type of the multiple types of graph properties, the selection process comprising:

selecting the first type;

analyzing the graph property data to determine a set of task options for the selected first type;

receiving a selected task, wherein the selected task is one of the task options;

receiving parameters of the selected task; and receiving an instruction to apply a first one of the one or more embedding techniques to the graph data.

14. The computer system of claim 13, wherein performing the selection process for the first type of the multiple types of graph properties comprises performing the selection process on each the multiple types of graph properties.

15. The computer system of claim 8, wherein the group of multiple embedding techniques are selected from group consisting of a node2vec embedding technique, a multi-hop embedding technique, and a random walk embedding technique.

16. The computer system of claim 8, wherein the processor operations further comprise:

transforming the graph data according to at least one of the one or more embedding techniques to produce a graph embedding; and using the task algorithm on the produced graph embedding to produce a task output.

17. A computer program product for matching a graph-under-analysis to a technique for embedding the graph-under-analysis, the computer program product comprising a computer readable program stored on a computer readable storage medium, wherein the computer readable program, when executed on a processor system, causes the processor system to perform processor system operations comprising:

receiving graph data representing the graph-under-analysis, wherein the graph-under-analysis represents a network;

analyzing the graph data to extract graph property data representing properties of the graph-under-analysis;

wherein analyzing the graph data comprises computing spectrum data of the graph-under-analysis and using the computed spectrum data to derive, directly from the computed spectrum data, the graph property data representing multiple types of the graph properties of the graph-under-analysis;

wherein the graph property data comprises the spectrum data of the graph-under-analysis;

annotating the graph data with the graph property data to generate annotated graph data;

wherein the spectrum data of the graph-under-analysis comprises eigenvalues of the graph-under-analysis's adjacency matrix;

based at least in part on the annotated graph data, selecting one or more embedding techniques;

wherein at least one of the one or more embedding techniques is configured to transform the graph data to a graph embedding that is used by a task algorithm to perform a task; and performing a selection process for each of the multiple types of graph properties, the selection process comprising:

selecting one of the multiple types of graph properties;

analyzing the graph property data to determine a set of task options for the selected one of the multiple types of graph properties;

receiving a selected task, wherein the selected task is one of the task options;

receiving parameters of the selected task; and receiving an instruction to apply a first one of the one or more embedding techniques to the graph data.

18. The computer program product of claim 17, wherein selecting the one or more embedding techniques comprises applying a set of embedding technique selection rules to the annotated graph data.

19. The computer program product of claim 18, wherein:

applying the set of embedding technique selection rules includes comparing the graph property data to a repository of stored graph property data comprising known graphs having known graph characteristics;

the stored graph property data is associated with stored known graph embedding techniques that have been used to translate at least one of the known graphs to a vector space on which a known task has been performed; and selecting the one or more embedding techniques is further based at least in part on a result of using the set of embedding technique selection rules to compare the graph property data to the stored graph property data.

20. The computer program product of claim 17, wherein selecting the one or more embedding techniques comprises applying the graph property data to a machine learning model that determines a level of similarity between the graph property data and stored graph property data.

\* \* \* \* \*